US012608181B2

(12) United States Patent
Golobokov et al.

(10) Patent No.: US 12,608,181 B2
(45) Date of Patent: Apr. 21, 2026

(54) GENERATION OF SYNTHETIC TRAINING DATA USING GRAMMAR MAPPING

(71) Applicant: Microsoft Technology Licensing, LLC, Redmond, WA (US)

(72) Inventors: Konstantin Andreyevich Golobokov, Seattle, WA (US); Zeqi Lin, Beijing (CN); Haizhen Zhang, Bothell, WA (US); Yu Hu, Sammamish, WA (US); Yousef Ahmed Al-Kofahi, Niskayuna, NY (US); Jonathan Richard Malsan, Redmond, WA (US); Haiyuan Cao, Issaquah, WA (US); Daniel Akintola Fatade, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 18/165,254

(22) Filed: Feb. 6, 2023

(65) Prior Publication Data

US 2024/0264809 A1 Aug. 8, 2024

(51) Int. Cl.
*G06F 8/30* (2018.01)
*G06F 8/41* (2018.01)
*G06F 40/211* (2020.01)

(52) U.S. Cl.
CPC ................. *G06F 8/37* (2013.01); *G06F 8/42* (2013.01); *G06F 40/211* (2020.01)

(58) Field of Classification Search
CPC . G06F 8/37; G06F 8/425; G06F 8/427; G06F 8/42; G06F 40/211
See application file for complete search history.

(56) References Cited

U.S. PATENT DOCUMENTS

| | | | |
|---|---|---|---|
| 10,217,059 B2 | 2/2019 | Yang | |
| 11,327,722 B1* | 5/2022 | Bahrami | G06F 8/311 |
| 11,720,346 B2* | 8/2023 | Wu | G06F 8/70 |
| | | | 707/741 |
| 2017/0220327 A1* | 8/2017 | Allen | G06F 40/205 |
| 2020/0097261 A1* | 3/2020 | Smith | G06F 40/174 |
| 2020/0110803 A1* | 4/2020 | Djalali | G06F 16/90332 |

(Continued)

OTHER PUBLICATIONS

Ansari et al; NLI-GSC: A Natural Language Interface for Generating SourceCode, 12 pages (Year: 2022).*

(Continued)

*Primary Examiner* — Wei Y Mui
*Assistant Examiner* — Brahim Bourzik
(74) *Attorney, Agent, or Firm* — Workman Nydegger

(57) ABSTRACT

The automatic generation of synthetic training data that can be used to train a language model to generate code examples following a code language based on a natural language input. Thus, new language models may be created, or existing language models may be fine-tuned, to adapt to automatically generate code without having to manually generate bulk quantities of training data. Rather, a many-to-many grammar mapping is navigated to generate training data. Specifically, the many-to-many grammar mapping maps code grammar to natural grammar. Then, each training data is generated by navigating the many-to-many grammar mapping definition to generate a mapping of a respective code expression to a respective natural language expression.

20 Claims, 3 Drawing Sheets

(56) References Cited

U.S. PATENT DOCUMENTS

| | | | |
|---|---|---|---|
| 2021/0142005 A1 | 5/2021 | Shankar | |
| 2021/0208855 A1* | 7/2021 | Zhang | G06F 8/36 |
| 2022/0138240 A1* | 5/2022 | Bahrami | G06F 11/3698 |
| | | | 717/120 |
| 2022/0236964 A1* | 7/2022 | Bahrami | G06F 8/74 |
| 2022/0365776 A1* | 11/2022 | Ramsl | G06V 10/82 |
| 2023/0046961 A1* | 2/2023 | Kurabayashi | G06F 8/425 |
| 2023/0100208 A1* | 3/2023 | Bahrami | G06F 18/23213 |
| | | | 717/143 |
| 2023/0119613 A1* | 4/2023 | Lin | G06F 40/186 |
| | | | 704/9 |
| 2024/0184555 A1* | 6/2024 | De Toni | G06N 3/045 |
| 2024/0330170 A1* | 10/2024 | Mesde | G06F 11/3692 |

OTHER PUBLICATIONS

International Search Report and Written Opinion received for PCT Application No. PCT/US2024/013903 (MS#412363- 1 PCT01) May 29, 2024, 15 pages.

"About GitHub Copilot", Retrieved from: https://docs.github.com/en/copilot/overview-of-github-copilot/about-github-copilot, Retrieved on: Sep. 15, 2022, 3 Pages.

"Azure OpenAI Service PREVIEW", Retrieved from: https://azure.microsoft.com/en-us/products/cognitive-services/openai-service/#overview, Retrieved on: Sep. 15, 2022, 14 Pages.

"huggingface/CodeBERTa-small-v1", Retrieved from: https://huggingface.co/huggingface/CodeBERTa-small-v1, Retrieved on: Sep. 15, 2022, 6 Pages.

"Programmatically Build Training Data", Retrieved from: https://www.snorkel.org/, Retrieved on: Sep. 15, 2022, 5 Pages.

"Spider 1.0 Yale Semantic Parsing and Text-to-SQL Challenge", Retrieved from: https://yale-lily.github.io/spider, Retrieved on: Sep. 15, 2022, 15 Pages.

Andrew, Ng, "MLOps: From Model-Centric to Data-Centric AI", Retrieved from: https://docplayer.net/213213717-Mlops-from-model-centric-to-data-centric-ai-andrew-ng.html, Jun. 2021, 29 Pages.

Belinkov, et al., "Synthetic and Natural Noise Both Break Neural Machine Translation", In Proceedings of International Conference on Learning Representations, Feb. 16, 2018, 13 Pages.

Brown, et al., "Language Models are Few-Shot Learners", In Proceedings of 34th Conference on Neural Information Processing Systems, Dec. 6, 2020, 25 Pages.

Chen, et al., "CodeT: Code Generation with Generated Tests", In Repository of arXiv:2207.10397v1, Jul. 21, 2022, 12 Pages.

Chen, et al., "Evaluating Large Language Models Trained on Code", In Repository of arXiv:2107.03374v1, Jul. 7, 2021, 35 Pages.

Cheng, et al., "AdvAug: Robust Adversarial Augmentation for Neural Machine Translation", In Proceedings of the 58th Annual Meeting of the Association for Computational Linguistic, Jul. 5, 2020, pp. 5961-5970.

Dehouck, et al., "Data Augmentation via Subtree Swapping for Dependency Parsing of Low-Resource Languages", In Proceedings of the 28th International Conference on Computational Linguistics, Dec. 8, 2013, pp. 3818-3830.

Deng, et al., "Structure-Grounded Pretraining for Text-to-SQL", In Proceedings of the Conference of the North American Chapter of the Association for Computational Linguistics: Human Language Technologies, Jun. 6, 2021, pp. 1337-1350.

Goswell, et al., "Common Data Model", Retrieved from: https://learn.microsoft.com/en-us/common-data-model/, Apr. 8, 2022, 4 Pages.

Guo, et al., "Revisiting Iterative Back-Translation from the Perspective of Compositional Generalization", In Proceedings of the AAAI Conference on Artificial Intelligence, vol. 35, Issue 9, May 18, 2021, pp. 7601-7609.

Herbert, et al., "List of CDM Data Types", Retrieved from: https://learn.microsoft.com/en-us/common-data-model/sdk/list-of-datatypes, Jul. 1, 2022, 65 Pages.

Herzig, et al., "Don't Paraphrase, Detect! Rapid and Effective Data Collection for Semantic Parsing", In Proceedings of Conference on Empirical Methods in Natural Language Processing and the 9th International Joint Conference on Natural Language Processing, Nov. 3, 2019, pp. 3810-3820.

Hu, et al., "LoRA: Low-Rank Adaptation of Large Language Models", In Proceedings of International Conference on Learning Representations, Apr. 2022, 13 Pages.

Jiao, et al., "TinyBERT: Distilling BERT for Natural Language Understanding", In Proceedings of Findings of the Association for Computational Linguistics: Empirical Methods in Natural Language Processing, Nov. 16, 2020, pp. 4163-4174.

Karimi, et al., "AEDA: An Easier Data Augmentation Technique for Text Classification", In Proceedings of Findings of the Association for Computational Linguistics: Empirical Methods in Natural Language Processing, Nov. 7, 2021, pp. 2748-2754.

Keysers, et al., "Measuring Compositional Generalization: A Comprehensive Method on Realistic Data", In Proceedings of International Conference on Learning Representations, Sep. 26, 2019, 38 Pages.

Kim, et al., "COGS: A Compositional Generalization Challenge Based on Semantic Interpretation", In Proceedings of Conference on Empirical Methods in Natural Language Processing, Nov. 16, 2020, pp. 9087-9105.

Kummerfeld, et al., "Improving Text-to-SQL Evaluation Methodology", In Proceedings of the 56th Annual Meeting of the Association for Computational Linguistics, vol. 1 Long Papers, Jul. 15, 2018, pp. 351-360.

Lake, et al., "Generalization without Systematicity: On the Compositional Skills of Sequence-to-Sequence Recurrent Networks", In Proceedings of the 35th International Conference on Machine Learning, vol. 80, Jul. 10, 2018, 10 Pages.

Li, et al., "Data Augmentation Approaches in Natural Language Processing: A Survey", In Repository of arXiv:2110.01852v1, Oct. 5, 2021, 42 Pages.

Liang, Percy, "Semantic Parsing for Natural Language Interfaces", Retrieved from: https://crossminds.ai/video/semantic-parsing-for-natural-language-interfaces-606fec85f43a7f2f827c1135/, Dec. 6, 2020, 3 Pages.

Lindhorst, Greg, "What is Microsoft Power Fx?", Retrieved from: https://powerapps.microsoft.com/en-us/blog/what-is-microsoft-power-fx/, Mar. 2, 2021, 17 pages.

Pelletier, Francisj. , "The Principle of Semantic Compositionality", In Journal of Topol, vol. 13, Issue 1, Mar. 1994, pp. 11-24.

Pl, et al., "Towards Robustness of Text-to-SQL Models Against Natural and Realistic Adversarial Table Perturbation", In Proceedings of the 60th Annual Meeting of the Association for Computational Linguistics, vol. 1: Long Papers, May 22, 2022, pp. 2007-2022.

Radford, et al., "Language Models are Unsupervised Multitask Learners", In Journal of OpenAI Blog, vol. 1, Issue 8, Feb. 24, 2019, 24 Pages.

Raffel, et al., "Exploring the Limits of Transfer Learning with a Unified Text-to-Text Transformer", In Journal of Machine Learning Research, vol. 21, Issue 140, Jun. 2020, 67 Pages.

Ratner, et al., "Snorkel: Rapid Training Data Creation with Weak Supervision", In Proceedings of the VLDB Endowment, vol. 11, Issue 3, Nov. 2017, pp. 269-282.

Shen, et al., "Mixture Models for Diverse Machine Translation: Tricks of the Trade", In Proceedings of the 36th International Conference on Machine Learning, May 24, 2019, 10 Pages.

Shin, et al., "Constrained Language Models Yield Few-Shot Semantic Parsers", In Proceedings of the Conference on Empirical Methods in Natural Language Processing, Nov. 7, 2021, pp. 7699-7715.

Shin, et al., "Few-Shot Semantic Parsing with Language Models Trained on Code", In Proceedings of the Conference of the North American Chapter of the Association for Computational Linguistics: Human Language Technologies, Jul. 10, 2022, pp. 5417-5425.

Shu, et al., "Logic-Consistency Text Generation from Semantic Parses", In Proceedings of Findings of the Association for Computational Linguistics: ACL-IJCNLP, Aug. 1, 2021, pp. 4414-4426.

(56)        References Cited

OTHER PUBLICATIONS

Sun, et al., "Mixup-Transformer: Dynamic Data Augmentation for NLP Tasks", In Proceedings of the 28th International Conference on Computational Linguistics, Dec. 8, 2020, pp. 3436-3440.

Thakur, et al., "Augmented SBERT: Data Augmentation Method for Improving Bi-Encoders for Pairwise Sentence Scoring Tasks", In Proceedings of the Conference of the North American Chapter of the Association for Computational Linguistics: Human Language Technologies, Jun. 6, 2021, pp. 296-310.

Wang, et al., "Building a Semantic Parser Overnight", In Proceedings of the 53rd Annual Meeting of the Association for Computational Linguistics and the 7th International Joint Conference on Natural Language Processing (vol. 1: Long Papers), Jul. 26, 2015, pp. 1332-1342.

Wang, et al., "CodeT5: Identifier-Aware Unified Pre-Trained Encoder-Decoder Models for Code Understanding and Generation", In Proceedings of the Conference on Empirical Methods in Natural Language Processing, Nov. 7, 2021, pp. 8696-8708.

Wei, et al., "EDA: Easy Data Augmentation Techniques for Boosting Performance on Text Classification Tasks", In Proceedings of the Conference on Empirical Methods in Natural Language Processing and the 9th International Joint Conference on Natural Language Processing, Nov. 3, 2019, pp. 6382-6388.

Wong, et al., "Machine Translation using Constraint-Based Synchronous Grammar", In Journal of Tsinghua Science and Technology, vol. 11, Issue 3, Jun. 2006, pp. 295-306.

Xie, et al., "Unsupervised Data Augmentation for Consistency Training", In Journal of Advances in Neural Information Processing Systems, vol. 33, Dec. 6, 2020, 13 Pages.

Xu, et al., "AutoQA: From Databases To QA Semantic Parsers With Only Synthetic Training Data", In Proceedings of the Conference on Empirical Methods in Natural Language Processing, Nov. 16, 2020, pp. 422-434.

Xu, et al., "Diversity-Promoting GAN: A Cross-Entropy Based Generative Adversarial Network for Diversified Text Generation", In Proceedings of the Conference on Empirical Methods in Natural Language Processing, Oct. 31, 2018, pp. 3940-3949.

Yang, et al., "Neural Retrieval for Question Answering with Cross-Attention Supervised Data Augmentation", In Proceedings of the 59th Annual Meeting of the Association for Computational Linguistics and the 11th International Joint Conference on Natural Language Processing (vol. 2: Short Papers), Aug. 1, 2021, pp. 263-268.

Yu, et al., "GraPPa: Grammar-Augmented Pre-Training for Table Semantic Parsing", In Repository of arXiv:2009.13845v2, May 29, 2021, 16 Pages.

Yu, et al., "Score: Pre-Training for Context Representation in Conversational Semantic Parsing", In Proceedings of International Conference on Learning Representations, Sep. 28, 2020, 16 Pages.

Yu, et al., "Spider: A Large-Scale Human-Labeled Dataset for Complex and Cross-Domain Semantic Parsing and Text-to-SQL Task", In Proceedings of the Conference on Empirical Methods in Natural Language Processing, Oct. 31, 2018, pp. 3911-3921.

Zhang, et al., "Character-level Convolutional Networks for Text Classification", In Journal of Advances in Neural Information Processing Systems, vol. 28, Dec. 7, 2015, 9 Pages.

Zhu, et al., "Texygen: A Benchmarking Platform for Text Generation Models", In Proceedings of the 41st International ACM SIGIR Conference on Research & Development in Information Retrieval, Jul. 8, 2018, pp. 1097-1100.

International Preliminary Report on Patentability received for PCT Application No. PCT/US2024/013903 (MS#412363-PCT01) mailed on Aug. 21, 2025, 10 pages.

* cited by examiner

*200*

*300*

Computing System
400

Processor(s)
402

Memory
404

406

Volatile

Non-Volatile

Network
410

Communication
Channels
408

UI 412

Output
412A

Input
412B

GENERATION OF SYNTHETIC TRAINING DATA USING GRAMMAR MAPPING

BACKGROUND

Conventional large-scale pretrained language models are capable of performing a wide range of tasks using natural language input. For example, such language models may be fine-tuned with additional training data to perform such tasks as generating code in response to natural language input. For instance, language models have conventionally been fine-tuned to generate code in such widely used programming languages as C, C++ and Python. Training data for fine-tuning language models to generate such widely used programming languages is available via open source channels.

Many software products offer their own libraries, SDKs and programming languages. Such programming languages are referred to as "domain-specific programming languages" or "DSLs". DSLs may have a niche syntax and complicated or incomplete documentation. To fine-tune a language model to generate code for DSLs, training data is generated mainly through crowdsourcing, and then focusing on performing improvement via model evolutions, such as using specialized model architecture and novel training techniques.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with the principles described herein, training data is automatically generated that is suitable for training a language model to generate code based on natural language input. Specifically, the synthesized training data is suitable for training a language model to generate code that follows code grammar based on natural language input than follows natural grammar. Thus, new language models may be created, or existing language models may be fine-tuned, to adapt to automatically generate code of different code grammar and/or natural grammar without having to manually generate bulk quantities of training data.

Rather, in accordance with the principles described herein, a many-to-many grammar mapping is navigated to generate training data. Specifically, the many-to-many grammar mapping maps code grammar to natural grammar. The code grammar is associated with a code language and defines how to form code strings from an alphabet of the code language in a way that the generated code strings are valid according to a syntax of the code language. On the other hand, the natural grammar is associated with a natural language and defines how to form natural language strings from an alphabet of the natural language in a way that the generated natural language strings at least approximates a syntax of the natural language.

Then, a plurality of training data is generated by, for each of at least some of the training data, navigating the many-to-many grammar mapping definition to generate a mapping of a respective code expression to a respective natural language expression. The navigation is at least partially random such that each of the plurality of training data is different than at least most of the other of the plurality of training data. The expression mapping may also potentially use context of name-value pairs to further populate values into the expression mappings.

Thus, training data may be synthesized so that sophisticated language models may be more easily trained and/or fine-tuned to generate code. This is particularly advantageous as new programming languages (such as domain-specific programming languages) are being constantly introduced and developed. Thus, rather than having to develop training data manually for each of such programming languages, the grammar mapping may instead be used to synthesize sufficient training data. Thus, language models may more effectively be used to generate code following new and continuously developing programming languages. Accordingly, the capabilities of a language model, and particularly a large language model, may be more fully utilized.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

In accordance with the principles described herein, training data is automatically generated that is suitable for training a language model to generate code based on natural language input. Specifically, the synthesized training data is suitable for training a language model to generate code that follows code grammar based on natural language input than follows natural grammar. Thus, new language models may be created, or existing language models may be fine-tuned, to adapt to automatically generate code of different code grammar and/or natural grammar without having to manually generate bulk quantities of training data.

Rather, in accordance with the principles described herein, a many-to-many grammar mapping is navigated to generate training data. Specifically, the many-to-many grammar mapping maps code grammar to natural grammar. The code grammar is associated with a code language and defines how to form code strings from an alphabet of the code language in a way that the generated code strings are valid according to a syntax of the code language. On the other hand, the natural grammar is associated with a natural language and defines how to form natural language strings from an alphabet of the natural language in a way that the generated natural language strings at least approximates a syntax of the natural language.

Then, a plurality of training data is generated by, for each of at least some of the training data, navigating the many-to-many grammar mapping definition to generate a mapping of a respective code expression to a respective natural language expression. The navigation is at least partially random such that each of the plurality of training data is different than at least most of the other of the plurality of training data. The expression mapping may also potentially use context of name-value pairs to further populate values into the expression mappings.

Thus, training data may be synthesized so that sophisticated language models may be more easily trained and/or fine-tuned to generate code. This is particularly advantageous as new programming languages (such as domain-specific programming languages) are being constantly introduced and developed. Thus, rather than having to develop training data manually for each of such programming languages, the grammar mapping may instead be used to synthesize sufficient training data. Thus, language models may more effectively be used to generate code following new and continuously developing programming languages. Accordingly, the capabilities of a language model, and particularly a large language model, may be more fully utilized.

Figure 1:
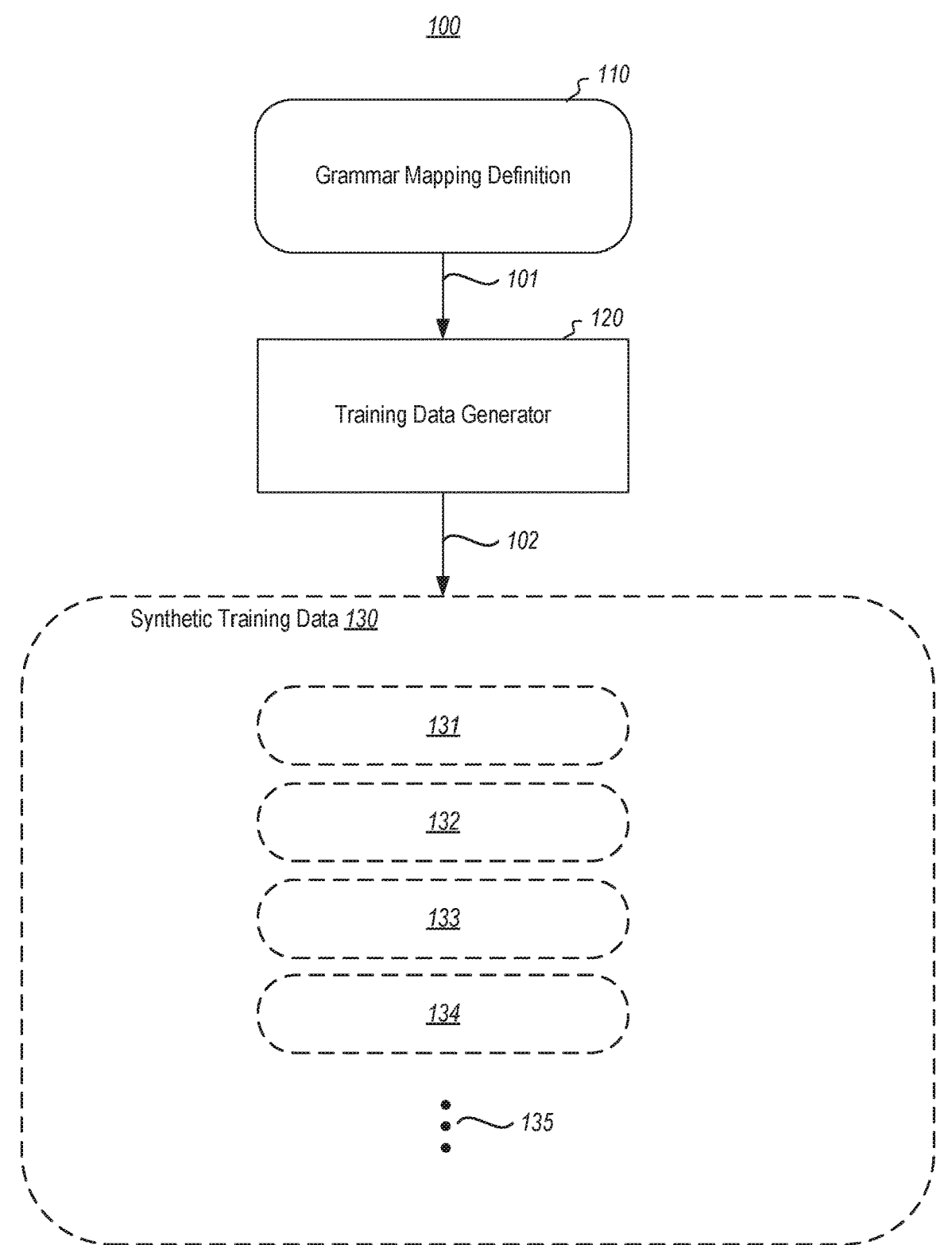
FIG. 1 illustrates an environment in which the principles described herein may operate, which includes a training data generator that generates expression mapping training data based on a grammar mapping definition.

FIG. 1 illustrates an environment 100 in which the principles described herein may operate. The environment 100 includes a grammar mapping definition 110 and a training data generator 120. The training data generator 120 accesses (as represented by arrow 101) the grammar mapping definition 110 to generate (as represented by arrow 102) synthetic training data 130. The training data generator 120 may be a computer-executable component. As an example, if the training data generator 120 was operated by a computing system, such as the computing system 400 described below with respect to FIG. 4, then the training data generator 120 may for example be structured as described below for the executable component 406 of FIG. 4.

The grammar mapping definition 110 is a many-to-many grammar mapping definition for mapping code grammar and natural grammar. The grammar mapping is "many-to-many" as the mapping is capable of mapping many different code grammar patterns to many different language grammar patterns. The synthetic training data 130 includes multiple expression mappings 131, 132, 133 and 134 that each represent a mapping of a code expression that follows the code grammar with a natural expression that follows the natural grammar. Each of the expression mappings 131, 132, 133 and 134 are distinct from each other, even though they each conform with the many-to-many grammar mapping definition 110 in that the code expression in the expression mapping follows the syntax of a code grammar pattern, and in that the language expression follows the syntax of the natural grammar pattern.

As represented by the ellipsis 135, the training data generator 120 may generate any number of expression mappings 130. However, each expression mapping represents an item of training data. Thus, the training data generator 120 may be used to synthesize a sufficient quantity of training data to train or fine-tune a language model to be able to generate code that follows the code grammar.

Figure 2:
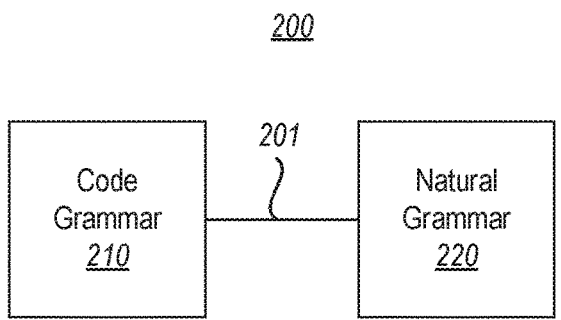
FIG. 2 illustrates a mapping environment in which code grammar is mapped to natural grammar, in accordance with the principles described herein.

FIG. 2 illustrates a mapping environment 200 in which code grammar 210 is mapped (as represented by line 201) to natural grammar 220. As an example, the grammar mapping definition 110 defines the mapping 201 between the code grammar 210 and the natural grammar 220.

The code grammar 210 is associated with a code language and defines how to form strings (also referred to herein as "code strings") from the code language in a way that the generated code strings are valid according to a syntax of the code language. The code language may be any programming language, whether currently existing or yet to be developed. The code language may be a general programming language (such as C, C++, Python, etch), or may be a domain-specific programming language. The principles described herein are not limited to the identity of the code language.

The natural grammar 220 is associated with a natural language and defines how to form strings (also called herein "natural language strings) from the natural language in a way that the generated natural language strings at least approximates a syntax of the natural language. As an example, the natural language may be any spoken and/or written language used to communicate naturally being human beings.

For instance, the natural language may be English. However, the natural language may be any other language used by human beings to communicate (e.g., by speaking, writing, and/or signing). Examples include Mandarin, Hindi, Spanish, French, Arabic, Russian, Portuguese, Indonesian, or any other natural language since the principles described herein are not limited to the identity of the natural language.

The natural language strings "at least approximate" a syntax of the natural language. This means that the natural language string either exactly follows recognized syntax of the natural language, or follows the syntax with some deviation that would still be cognizable to a speaker of the natural language. Thus, it is not necessary that the natural language string to follow exact grammar rules of the natural language. For instance, the natural language "Create a program definition" follows exact English grammar, but the language "Create program definition" does not since the indefinite article is omitted. Nevertheless, the natural language "Create program definition" will be understood by English speakers. Thus, providers of natural language may provide more comfortable natural language input to the trained language model, and still obtain appropriate generated code. Furthermore, this flexibility allows for some migration of natural language grammar rules, and colloquial uses of natural language, whilst still obtaining properly generated code.

Figure 3:
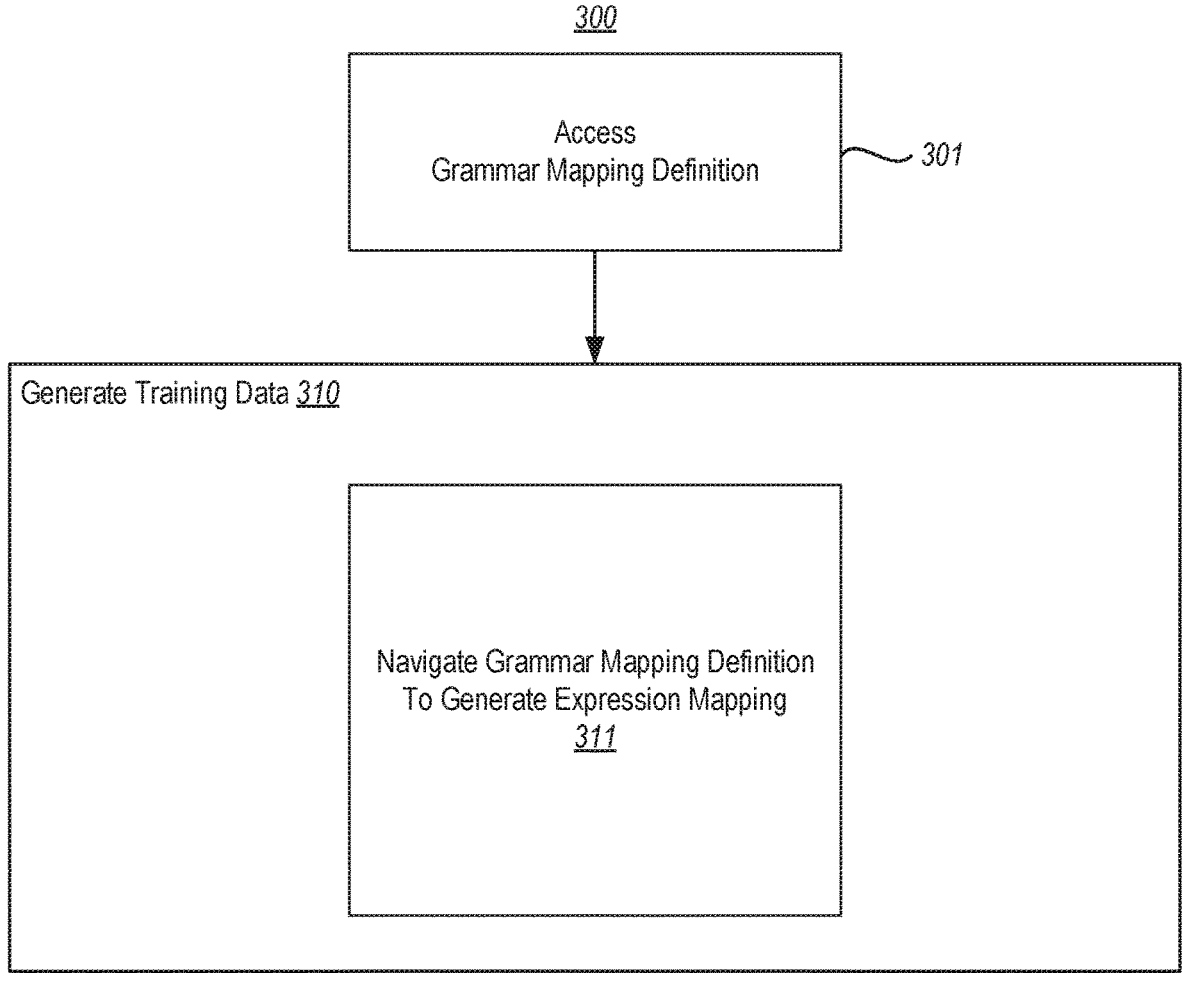
FIG. 3 illustrates a flowchart of a method for generating training data, in accordance with the principles described herein.

FIG. 3 illustrates a method 300 for generating training data, in accordance with the principles described herein. As an example, the method 300 may be performed by the training data generator 120 of FIG. 1. The method 300 includes accessing (act 301) a many-to-many grammar mapping definition for mapping code grammar and natural grammar. As an example, the many-to-many grammar mapping definition may be the grammar mapping definition 110 of FIG. 1, and perhaps more specifically the mapping 201 of FIG. 2. Furthermore, the accessing (act 301) of that grammar mapping definition may be represented by the arrow 101 of FIG. 1.

The method 300 then includes generating a plurality of training data (act 310). This generation is performed by performing a number of acts illustrated within the act 310) to generate each item of training data in the form of expression mappings. Specifically, the many-to-many grammar mapping definition is navigated (act 311) to generate a mapping of a respective code expression to a respective natural language expression. Referring to FIG. 1, the navigation (act 311) may be performed four times (one time each) to generate the expression mapping 131, the expression mapping 132, the expression mapping 133, and the expression mapping 134. Nevertheless, the navigation is at least partially random such that each of the expression mappings is different than at least most of the other expression mappings.

A specific example will now be provided. In this example, the many-to-many grammar mapping definition is represented by a tree structure. Furthermore, the navigation is downwards from root node to a leaf node in that tree structure. In this case, the navigation is performed at least partially randomly navigating the tree structure downward to formulate at least an intermediate form of an expression mapping.

The example grammar mapping definition is as follows expressed in YAML format and with line numbering added for ease of reference.

```
 1. GroupName: "Question"
 2. IsRoot: True
 3. Templates:
 4.    -MRPatterns: [ "Filter(@DataSource@, @Cond@)" ]
 5.    NLPatterns: [ "Show @0@ whose @1@" ]
 6.
 7. GroupName: "Cond"
 8. Templates:
 9.    -MRPatterns:[ "@CondBase@" ]
10.    ["@0@"]
11.    -MRPatterns: [ "@CondBase@ And @CondBase@" ]
12.    NLPatterns: [ "@0@ and @1@" ]
13.    -MRPatterns: [ "@CondBase@ Or @CondBase@" ]
14.    NLPatterns: [ "@0@ or @1@" ]
15.
16. GroupName: "CondBase"
17. Templates:
18.    -MRPatterns: [ "@NumberColumn@ @Comp@ @Number@" ]
19.    NLPatterns: [ "@0@ @1@ @2@" ]
20.
21. GroupName: "Comp"
22. Templates:
23.    -MRPatterns: [ ">" ]
24.    NLPatterns: [ "is @GreaterThan@" ]
25.    - MRPatterns: [ "<" ]
26.    NLPatterns: [ "is @LessThan@" ]
```

The grammar mapping definition schema in this example is based on a Group→Template→Pattern hierarchical structure. Each group consists of one or more templates. Each template consists of one or more pairs that each include an MR patterns and an NL pattern. An MR pattern is a pattern associated with code grammar. An NL pattern is a pattern associated with natural grammar. When a group has an IsRoot name of value "True", this is the root node in a tree structure. The generation of an expression mapping occurs in this example by randomly navigating the tree structure from the root node, sampling <MR,NL> pairs, and composing the expression mapping with each sampling.

In this example, the computing system may take an example random navigation through the tree structure, which will now be described. The system begins with the Group named "Question" (see line 1) since that Group has an IsRoot parameter value of "True" (see line 2). Here, there is but one Template (see line 3) that has a single <MR,NL> pair. Where a template has but a single <MR,NL> pair, the selection of the <MR,NL> pair from that template is reduced to simply selecting that single <MR,NL> pair. So after the sampling from Group "Question", the expression mapping composition begins with:

MR: "Filter(@DataSource@, @Cond@)"]
NL: "Show @0@ whose @1@".

Then, the system recursively iterates each of the groups in the sampled pair until a terminal group (e.g., a leaf node in the tree structure) is sampled (where an IsAtom parameter value is "True"). In the above example, there is no group where there is an IsAtom parameter value of "True". But this description will describe the first navigation as far as possible to illustrate the general principle of navigating the grammar definition.

Returning to the first navigation example, after the Group named "Question" is sampled, the computing system obtains the following expression mapping composition:

MR: "Filter(@DataSource@1, @Cond@1)"]
NL: "Show @0@ whose @1@".

The MR pattern contains a reference to two nonterminal Groups including DataSource and Cond. The number after the reference refers to the order in which the same named group appears within the MR pattern. Since the Group DataSource and the Group Cond only appear once within the MR pattern, they each have the suffix "1". The NL representation also contains two non terminal Groups. Specifically, @0@ refers to the first group mentioned in the respective MR representation (i.e., DataSource), and @1@ refers the second group mentioned in the respective MR representation (i.e., Cond). In general, the NL pattern includes references @X@ where "X" is a whole number that represents the order of the group within the MR representation.

Here, there is a Group named "Cond" in the grammar mapping definition (defined from lines 7-14). Furthermore, the Template element includes three possible <MR,NL> pairs that can be sampled. This is where random navigation comes in. Because there are multiple possible pairs <MR, NL> pairs, one is selected at random. Suppose for this example that the second <MR,NL> pair is sampled. In other words, the system samples the following <MR,NL> pair from the Template element of the Cond Group.

MRPatterns: ["@CondBase@ And @CondBase@" ]
NLPatterns: ["@0@ and @1@"]

The expression mapping composition then comes from combining both the <MR,NL> pair sampled from the Group "Question" and the <MR,NL> pair sampled from the Group "Cond". The expression mapping composition then becomes the following:

MR: "Filter(@DataSource@1, @CondBase@1 And @CondBase@2)"
NL: "Show @0@ whose @1@ and @2@"

Here, there are two Group of the name "CondBase" referred to in the composed MR pattern. The Group "CondBase" is defined in lines 16-19. Here, the Template element includes but one <MR,NL> pair which is the following:

MRPatterns: ["@NumberColumn@ @Comp@ @Number@"]
NLPatterns: ["@@@@@@2@"]

That <MR,NL> pair is sampled (once for each reference to CondBase) since it is the only pair in the Group Cond-Base. With this additional sampling, the expression mapping composition may then be rewritten again, but now as follows:

MR: "Filter(@DataSource@1, @NumberColumn@1 @Comp@1 @Number@1 And @NumberColumn@2@Comp@2@Number@2"

NL: "Show @0@ whose @1@@2@@3@ and @4@@5@@6@"

Here, there are two Group of the name "Comp" referred to in the composed MR pattern. The Group "Comp" is defined in lines 21-26. Here, the Template element includes but two <MR,NL> pairs, a first in lines 23 and 24, and a second in lines 25 and 26. Thus, these two pairs can be randomly sampled for each instance of Comp in the MR pattern composed thus far. Suppose that in this example, the second <MR,NL> pair of the Comp Group is sampled for the first instance of Comp, and that the first <MR,NL> pair of the Comp Group is sampled for the second instance of Comp. In this case, the expressing mapping composition would be rewritten as follows:

MR: "Filter(@DataSource@1, @NumberColumn@1< @Number@1 And @NumberColumn@2> @Number@2"

NL: "Show @0@ whose @1@ is @LessThan@ @2@ and @3@ is greater than @4@"

The Groups GreaterThan and LessThan may be built-in lexicon groups in an example framework. The Groups DataSource and NumberColumn may be built-in context groups. That is, their nonterminals can be further written by sampling from the provided contexts. Sampling from contexts will be referred to hereinafter.

The expression mapping composition to this point may be seen as an intermediate form of an expression mapping. But note that due to the random sampling of <MR/NL> pairs from each group, another navigation might likely result in a different intermediate form of the expression mapping. This intermediate form of the expression mapping may further be subject to application of context in the form of name-value pairs. For example, suppose that the following is such a context.

```
tables:
  -name: "Students"
  columns:
    -displayName: "Name"
    originalName: "stu_name"
    dataType: "Text"
    - displayName: "Age"
    originalName: "stu_age"
    dataType: "Age"
    - displayName: "Height"
    originalName: "stu_height"
    dataType: "Number"
    - displayName: "Advisor"
    originalName: "advisor"
    dataType: "Lookup:Teachers"
    - name: "Teachers"
    columns:
    - displayName: "Name"
    originalName: "teacher_name"
    dataType: "Text"
    - displayName: "Salary"
    originalName: "salary"
    datatype: "Number"
```

The intermediate expression mapping composition may then be subject to application of such context to generate the following expression mapping:

NL: "Show students whose age is below @Number@1 and height is greater than @Number@2"

MR: "Filter('Students', 'Age'<@0@ And 'Height'<@1@)"

The application of diverse context allows for a greater variety of training data to be generated, which ultimately results in a language model that is more capable of generating code in response to a wide variety of natural language. Furthermore, the YAML grammar definition example was just a small example of a grammar mapping. A grammar mapping definition that has a greater number of groups and/or a greater number of <MR,NL> pairs per Template may likewise result in diverse variety of expression mappings. Further diversity may be obtained perturbing the natural language expression. This perturbation may vary from the natural grammar but in defined ways. For instance, commas may be added to the NL pattern "Show students whose age is below @Number@1 and height is greater than @Number@2" to read rather, ""Show students whose age is below @Number@1, and whose height is greater than @Number@2". Such perturbations allow for even further diversity of training data to ensure that the language model can respond well to different manners of speaking or writing the same natural language.

In one embodiment, weighted sampling of <MR,NL> pairs may be used. This feature helps control the data distribution within the training data. As an example, each group, template, or pattern may be assigned a weight (e.g., defaulting to 1.0). For instance, in one example there should be twice as many simple conditions as compound conditions in the synthesized training data, the Cond group for the grammar mapping definition may be altered as follows (again line numbers added for ease of reference).

```
1.    GroupName: "Cond"
2.    Templates:
3.      -MRPatterns: [ "@CondBase@" ]
4.      [ "@0@"]
5.    SampleFactor: 4.0
6.      -MRPatterns: [ "@CondBase@ And @CondBase@" ]
7.    NLPatterns: [ "@0@ and @1@" ]
8.      -MRPatterns: [ "@CondBase@ Or @CondBase@" ]
9.    NLPatterns: [ "@0@ or@1@" ]
```

See in particular the SampleFactor parameter having value 4.0.

Previously, the concept of built-in groups was introduced. The built-in groups allow users that are generating the grammar mapping definition to more quickly get started building such definitions. Such built-in groups may include ContextGroups, such as DataSource, NumberColumn, and AgeColumn, that provide data placeholders that can be replaced from a context definition. Alternatively, or in addition, such built-in groups may include Lexicon Groups, such as GreaterThan, LessThan, and SortBy, that provide alternative ways of describing the same operation. For instance, SortBy may be described as "Sort by" or "Order by" in natural language. Alternatively, or in addition, such built-in groups may include Repetition Groups, such as CondFrom2to4, which represents the repetition of the Cond group from two to four times. The delimiters in MR and NL may also be configurable.

In some embodiments, the grammar mapping definition may be used to constrain the data space to a smaller and more reasonable scope. For instance, each MR pattern may have zero or more controlled conditions based on the placeholders used in the pattern for describing the possible generative data space. For example, consider the following <MR,NL> pair.

MRPatterns: ["@NumberColumn@>=@Number@ And @NumberColumn@<=@Number@"]

NLPatterns: ["@0@ is between @1@ and @3@"]

The MRPattern contains two NumberColumn placeholders, while they should be instantiated in the same column. In other words, this MRPattern should be associated with the constraint that @0@==@2@. An example syntax that allows the concise specification of such constraints is as follows:

of such DataGen provides syntactic sugar that allows MRPatterns: ["@NumberColumn@>=@Number@ And @0@<=@Number@"] NLPatterns: ["@0@ is between @1@ and @2@"]

Alternatively, or in addition, constraints may be specified based on binary relations. An example of this is the relationship between tables and columns. Consider this MRPattern: Filter(@DataSource@, @Cond@). In this example, all sampled columns within the Cond placeholder are to belong to the sampled table for the DataSource placeholder. Such general constraints may be implemented as built-in constraints (e.g., they are activated by default). In that case, columns will be sampled from the most suitable tables (determined by a built-in automated algorithm), rather than random tables. For complicated cases, the system may also specify such constraints explicitly, just like:

MRPatterns: ["SELECT a.@GuidColumn{t1}@, COUNT(*)

FROM @DataSource@ as a JOIN @DataSource@ as b ON a.@0@=b.@GuidColumn{t2 and fk(@0@, this)}@ GROUP BY a.@0@"]

NLPatterns: ["For each @2@, how many @1@ are there?"]

In some embodiments, an extensible validator pattern may allow for the user to run custom code against the generated <MR,NL> pair, yielding a Boolean representing validity. For generated MR, this may take the form of syntax validation. However, the user can implement custom checks, such as an argument checker for a specific application development tool. Users can filter generated examples based on pairs that pass the validitor, giving higher confidence in the generated data points.

A user may construct the grammar mapping definition. However, to make the process easily built-in groups may be provided as already described. Additionally, much of the process of writing the grammar mapping definition may be further automated. This may be referred to as "grammar induction", which generates grammar from seed mappings as an AI-assisted parsing task where a human supervises the generation. For instance, a user might have only a few (e.g., 3 to 7) mapped examples of corresponding <MR,NL> pairs. A "mapped" seed mapping annotates semantically equivalent subspans of <MR,NL> sequences. Furthermore, a user might provide a list (e.g., ten or more) seed mapping for each desired function. A "seed" mapping may be a pair of corresponding <MR,NL> sequences.

Accordingly, the principles described herein allow for the generation of training data that each maps a code expression of a particular code language into a natural expression of a particular natural language. In accordance with some embodiments described herein, this may be done for more than just one code language and/or more than just one natural language. In this case, there may be different grammar mapping definition depending on an identity of the code language. Alternatively, there may be a different grammar mapping definition depending on the identity of the natural language. Alternatively, there may be a different grammar mapping definition depending on a combination of the identity of the code language and the identity of the natural language. In this case, the method would further include identifying the code language and/or the natural language that the training data is follow, and then selecting the appropriate grammar mapping definition.

As the principles described herein are performed in the context of a computing system, a computing system will now be described with respect to FIG. 4. However, the principles described herein are not limited to operation within a computing system such as described with respect to FIG. 4.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 4:
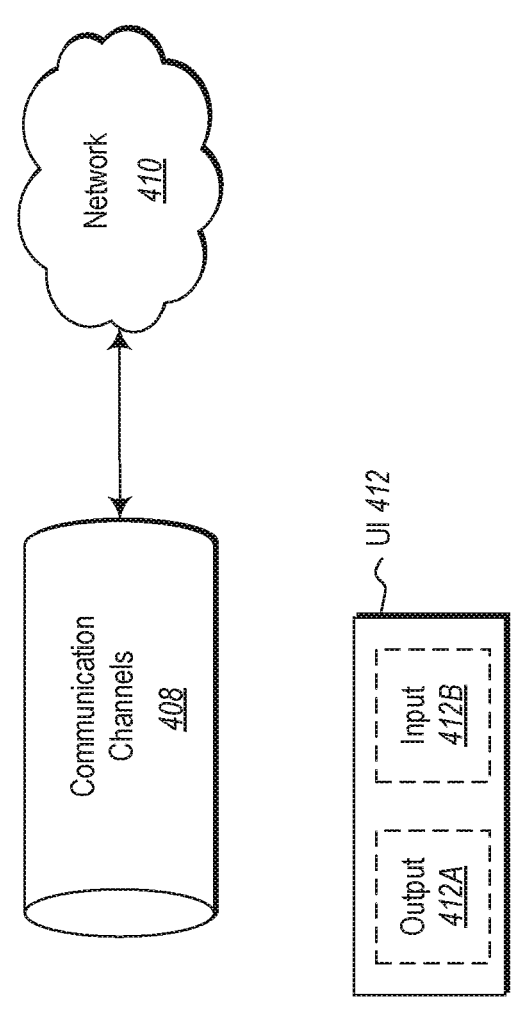
FIG. 4 illustrates an example computing system in which the principles described herein may be employed.

As illustrated in FIG. 4, in its most basic configuration, a computing system 400 includes at least one hardware processing unit 402 and memory 404. The processing unit 402 includes a general-purpose processor. Although not required, the processing unit 402 may also include a field programmable gate array (FPGA), an application specific integrated circuit (ASIC), or any other specialized circuit. In one embodiment, the memory 404 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 400 also has thereon multiple structures often referred to as an "executable component". For instance, the memory 404 of the computing system 400 is illustrated as including executable component 406. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 404 of the computing system 400. Computing system 400 may also contain communication channels 408 that allow the computing system 400 to communicate with other computing systems over, for example, network 410.

While not all computing systems require a user interface, in some embodiments, the computing system 400 includes a user interface system 412 for use in interfacing with a user. The user interface system 412 may include output mechanisms 412A as well as input mechanisms 412B. The principles described herein are not limited to the precise output mechanisms 412A or input mechanisms 412B as such will depend on the nature of the device. However, output mechanisms 412A might include, for instance, speakers, displays, tactile output, virtual or augmented reality, holograms and so forth. Examples of input mechanisms 412B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed:

1. A computing system that generates synthetic training data, said computing system comprising:

one or more processors; and one or more hardware storage devices that store instructions that are executable by the one or more processors to cause the computing system to:

access a many-to-many grammar mapping definition for mapping code grammar and natural grammar, the code grammar being associated with a code language and defining how to form code strings from an alphabet of the code language in a way that the code strings are valid according to a syntax of the code language, the natural grammar being associated with a natural language and defining how to form natural language strings from an alphabet of the natural language in a way that the natural language strings at least approximate a syntax of the natural language;

generate a plurality of mappings between code expressions and natural language expressions by navigating the many-to-many grammar mapping definition to respectively generate a respective mapping of a respective code expression to a respective natural language expression, wherein the navigation includes a random sampling of the many-to-many grammar mappings definition such that each mapping in the plurality of mappings is different than at least most of the other mappings in the plurality of mappings, and wherein, as a result of the random sampling of the many-to-many grammar mappings definition, a different navigation results in a different intermediate form of an expression mapping, which is associated with the plurality of mappings;

select a first pair from among the plurality of mappings, the first pair comprising a first mapping between a first code expression and a first natural language expression;

syntactically validate the first code expression by executing an argument checker for a specific application development tool against the first code expression; and in response to the argument checker syntactically validating the first code expression, include the first pair in a plurality of training data.

2. The computing system in accordance with claim 1, the instructions being further executable to cause the computing system to:

identify a code language that the training data is to follow; and selecting the many-to-many grammar mapping definition corresponding to the identified code language, wherein there are different applicable many-to-many grammar mapping definition depending at least upon the identity of the code language.

3. The computing system in accordance with claim 2, the instructions being further executable to cause the computing system to:

identify a natural language that the training data is to follow; the selecting of the many-to-many grammar mapping definition that also corresponds to the identified natural language, wherein there are different applicable many-to-many grammar mapping definition depending at least upon the identity of the code language and the identity of the natural language.

4. The computing system in accordance with claim 1, the instructions being further executable to cause the computing system to:

identify a natural language that the training data is to be have; and select the many-to-many grammar mapping definition corresponding to the identified natural language, wherein there are different applicable many-to-many grammar mapping definition depending at least upon the identity of the natural language.

5. The computing system in accordance with claim 1, wherein there are different applicable many-to-many grammar mapping definition depending at least upon one of the identity of the code language and the identity of the natural language, the different many-to-many grammar mapping definitions following a common grammar definition schema.

6. The computing system in accordance with claim 1, the many-to-many grammar mapping definition comprising a tree structure that is navigable downward from root node to a leaf node, the navigating of the many-to-many grammar mapping definition performed by randomly navigating the tree structure downward from the root node to formulate at least an intermediate form of the mapping of a respective code expression to a respective natural language expression.

7. The computing system in accordance with claim 6, wherein the intermediate form of the mapping of a respective code expression is further subject to application of context in the form of name-value pairs.

8. The computing system in accordance with claim 1, the instructions being further executable to cause the computing system to automatically generate the many-to-many grammar mapping based on a plurality of seed mappings between natural language expressions and code expressions.

9. The computing system in accordance with claim 1, wherein generating the plurality of training data is further performed by perturbing a representation of each of at least some of the mappings of respective code expressions and respective natural language expressions.

10. The computing system in accordance with claim 1, wherein generating the plurality of training data is also performed by using validation rules to filter a representation of each of at least some of the mappings of respective code expressions and respective natural language expressions.

11. The computing system in accordance with claim 1, wherein generating the plurality of training data is also performed by using validation rules to alter a representation of each of at least some of the mappings of respective code expressions and respective natural language expressions.

12. A method for generating synthetic training data to train a language model to generate code examples following a code language based on a natural language input, the method comprising:

accessing a many-to-many grammar mapping definition for mapping code grammar and natural grammar, the code grammar being associated with a code language and defining how to form code strings from an alphabet of the code language in a way that the code strings are valid according to a syntax of the code language, the natural grammar being associated with a natural language and defining how to form natural language strings from an alphabet of the natural language in a way that the natural language strings at least approximate a syntax of the natural language;

generating a plurality of mappings between code expressions and natural language expressions by navigating the many-to-many grammar mapping definition to respectively generate a respective mapping of a respective code expression to a respective natural language expression, wherein the navigation includes a random sampling of the many-to-many grammar mappings definition such that each mapping in the plurality of mappings is different than at least most of the other mappings in the plurality of mappings, and wherein, as a result of the random sampling of the many-to-many grammar mappings definition, a different navigation results in a different intermediate form of an expression mapping, which is associated with the plurality of mappings;

selecting a first pair from among the plurality of mappings, the first pair comprising a first mapping between a first code expression and a first natural language expression;

syntactically validating the first code expression by executing an argument checker for a specific application development tool against the first code expression; and in response to the argument checker syntactically validating the first code expression, including the first pair in a plurality of training data.

13. The method in accordance with claim 12, further comprising identifying a code language that the training data is to have; and

selecting the many-to-many grammar mapping definition corresponding to the identified code language, wherein there are different applicable many-to-many grammar mapping definition depending at least upon the identity of the code language.

14. The method in accordance with claim 13, further comprising identifying a natural language that the training data is to have; and selecting the many-to-many grammar mapping definition corresponding to the identified natural language, wherein there are different applicable many-to-many grammar mapping definition depending at least upon the identity of the natural language.

15. The method in accordance with claim 12, the many-to-many grammar mapping definition comprising a tree structure that is navigable downward from root node to a leaf node, the navigating of the many-to-many grammar mapping definition performed by randomly navigating the tree structure downward from the root node to formulate at least an intermediate form of the mapping of a respective code expression to a respective natural language expression.

16. The method in accordance with claim 15, further comprising:

further subjecting the intermediate form of the mapping of a respective code expression to application of context in the form of name-value pairs.

17. The method in accordance with claim 12, wherein automatically generating the many-to-many grammar mapping is based on a plurality of seed mappings between natural language expressions and code expressions.

18. The method in accordance with claim 12, the generation of the plurality of training data is also performed by including perturbing a representation of each of at least some of the mappings of respective code expressions and respective natural language expressions.

19. The method in accordance with claim 12, wherein the generation of the plurality of training data is also performed by including using validation rules to filtering a representation of each of at least some of the mappings of respective code expressions and respective natural language expressions.

20. One or more hardware storage devices that store instructions that are executable by one or more processors to cause the one or more processors to:

access a many-to-many grammar mapping definition for mapping code grammar and natural grammar, the code grammar being associated with a code language and defining how to form code strings from an alphabet of the code language in a way that the code strings are valid according to a syntax of the code language, the natural grammar being associated with a natural language and defining how to form natural language strings from an alphabet of the natural language in a way that the natural language strings at least approximate a syntax of the natural language; and generate a plurality of mappings between code expressions and natural language expressions by navigating the many-to-many grammar mapping definition to respectively generate a respective mapping of a respective code expression to a respective natural language expression, wherein the navigation includes a random sampling of the many-to-many grammar mappings definition such that each mapping in the plurality of mappings is different than at least most of the other mappings in the plurality of mappings, and wherein, as a result of the random sampling of the many-to-many grammar mappings definition, a different navigation results in a different intermediate form of an expression mapping, which is associated with the plurality of mappings;

select a first pair from among the plurality of mappings, the first pair comprising a first mapping between a first code expression and a first natural language expression;

syntactically validate the first code expression by executing an argument checker for a specific application development tool against the first code expression; and in response to the argument checker syntactically validating the first code expression, include the first pair in a plurality of training data.

\* \* \* \* \*